(12) United States Patent
Motakef et al.

(10) Patent No.: US 8,468,830 B2
(45) Date of Patent: Jun. 25, 2013

(54) INLET AIR HEATING AND COOLING SYSTEM

(75) Inventors: Abbas Motakef, Norcross, GA (US); Peter Feher, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 882 days.

(21) Appl. No.: 12/332,380

(22) Filed: Dec. 11, 2008

(65) Prior Publication Data

US 2010/0146976 A1 Jun. 17, 2010

(51) Int. Cl.
*F02C 1/00* (2006.01)
*F02C 3/30* (2006.01)
*F25D 9/00* (2006.01)

(52) U.S. Cl.
USPC .......... 60/728; 60/775; 62/79; 62/98; 62/113; 62/401; 62/402

(58) Field of Classification Search
USPC ............... 60/39.182, 39.53, 728, 775; 62/79, 62/87, 98, 99, 113, 201, 238.1, 238.6, 238.7, 62/259.4, 401, 402, 513
See application file for complete search history.

(56) References Cited

U.S. PATENT DOCUMENTS

| | | | |
|---|---|---|---|
| 3,788,066 A | 1/1974 | Nebgen | |
| 3,796,045 A * | 3/1974 | Foster-Pegg | 60/772 |
| 4,519,207 A | 5/1985 | Okabe et al. | |
| 4,951,460 A * | 8/1990 | Prochaska et al. | 60/791 |
| 5,203,161 A | 4/1993 | Lehto | |
| 5,444,971 A | 8/1995 | Kohlenberger | |
| 6,318,065 B1 | 11/2001 | Pierson | |
| 6,470,686 B2 | 10/2002 | Pierson | |
| 6,532,754 B2 | 3/2003 | Haley et al. | |
| 6,769,258 B2 | 8/2004 | Pierson | |
| 6,848,267 B2 | 2/2005 | Pierson | |
| 6,964,168 B1 | 11/2005 | Person et al. | |
| 7,343,746 B2 | 3/2008 | Pierson | |
| 2002/0053196 A1 * | 5/2002 | Lerner et al. | 60/39.182 |
| 2005/0056023 A1 * | 3/2005 | Pierson | 60/772 |
| 2005/0103032 A1 | 5/2005 | Pierson | |
| 2005/0223728 A1 * | 10/2005 | Stuhlmueller | 62/238.3 |
| 2007/0240400 A1 * | 10/2007 | Smith et al. | 60/39.182 |
| 2007/0248453 A1 | 10/2007 | Tetu et al. | |
| 2007/0294984 A1 | 12/2007 | Chillar et al. | |
| 2008/0098890 A1 | 5/2008 | Feher | |
| 2008/0098891 A1 | 5/2008 | Feher et al. | |

FOREIGN PATENT DOCUMENTS

| | | |
|---|---|---|
| AU | 697987 B2 | 10/1998 |
| EP | 0378003 A1 | 7/1990 |
| JP | 2003239760 A | 8/2003 |
| WO | 9709578 A2 | 3/1997 |
| WO | 0196723 A1 | 12/2001 |
| WO | 2005/119029 A1 | 12/2005 |

OTHER PUBLICATIONS

European Search Report from corresponding EP Application No. 09177609.6, Jun. 8, 2011.
First Office Action for Chinese Application No. 200910258697.1 mailed Apr. 16, 2013.

* cited by examiner

*Primary Examiner* — Phutthiwat Wongwian
*Assistant Examiner* — Michael B Mantyla
(74) *Attorney, Agent, or Firm* — Sutherland Asbill & Brennan LLP

(57) ABSTRACT

A heating and cooling system for inlet air of a turbine compressor. The heating and cooling system may include a fluid coil positioned about the turbine compressor and a thermal energy storage tank. The fluid coil and the thermal energy storage tank are in fluid communication such that fluid is both provided to the fluid coil from the thermal energy storage tank for exchanging heat with the inlet air and returned to the thermal energy storage tank without further heat exchange.

12 Claims, 2 Drawing Sheets

INLET AIR HEATING AND COOLING SYSTEM

TECHNICAL FIELD

The present application relates generally to gas turbine engines and more particularly relates to gas turbine inlet air systems that provide free inlet air heating and cooling.

BACKGROUND OF THE INVENTION

Air chilling systems are often used with gas turbines to condition the inlet air temperature. Depending upon the ambient temperature, the use of the chilling systems with gas turbine engines may increase overall power output by a significant percentage. Specifically, the power output of the gas turbine is almost in reverse proportion to the inlet air temperature over a wide temperature range. For example, a known gas turbine may produce only about 154 megawatts of power at an ambient temperature of about 83 degrees Fahrenheit (about 28.3 degrees Celsius) but may produce about 171.2 megawatts of power at about 50 degrees Fahrenheit (about 10 degrees Celsius), an increase of more than about eleven percent. Likewise, the chilling systems may temper the cold inlet air with waste heat in cooler ambient temperatures so as to provide efficient part load operation for the gas turbine.

Known air chilling systems, however, generally use a refrigeration plant to produce cold water. As such, an external energy source is required to run the refrigeration plant. This parasitic power drain thus may compromise somewhat the overall power plant output and efficiency.

There is thus a desire for improved gas turbine inlet air heating and cooling systems. Such heating and cooling systems should provide for enhanced heating and cooling of gas turbine inlet air temperatures while increasing overall system power output and efficiency.

SUMMARY OF THE INVENTION

The present application thus provides a heating and cooling system for inlet air of a turbine compressor. The heating and cooling system may include a fluid coil positioned about the turbine compressor and a thermal energy storage tank. The fluid coil and the thermal energy storage tank are in fluid communication such that fluid is both provided to the fluid coil from the thermal energy storage tank for exchanging heat with the inlet air and returned to the thermal energy storage tank without further heat exchange.

The present application further provides for a method of free heating and cooling of inlet air of a compressor. The method may include the steps of flowing a fluid at a first temperature from a first end of a thermal energy storage tank directly to a coil, exchanging heat in the coil with a first incoming flow of the inlet air such that the fluid reaches a second temperature, flowing the fluid at the second temperature directly to a second end of the thermal energy storage tank, and flowing the fluid from the second end of the thermal energy storage tank directly to the coil to exchange heat with a second incoming flow of the inlet air.

These and other features of the present application will become apparent to one of ordinary skill in the art upon review of the following detailed description when taken in conjunction with the several drawings and the appended claims.

DETAILED DESCRIPTION

Figure 1:
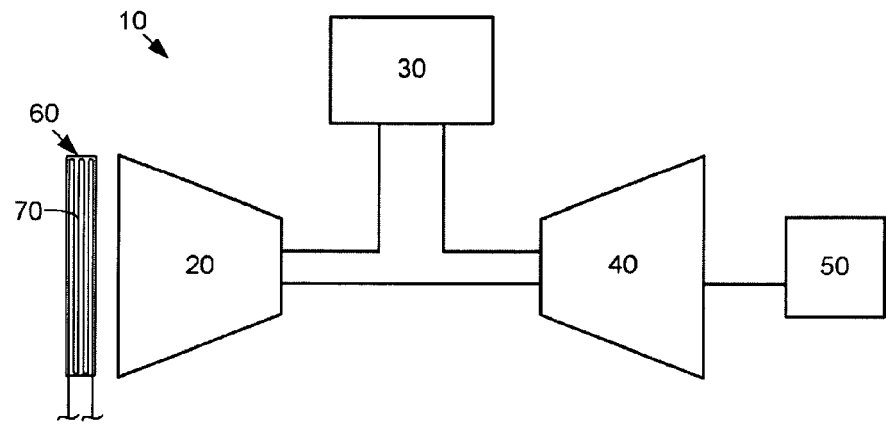
FIG. 1 is a schematic view of a gas turbine engine with an inlet air chilling system.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a flow of fuel and ignites the mixture. (Although only a single combustor 30 is shown, the gas turbine engine 10 may include any number of combustors 30.) The hot combustion gases are delivered in turn to a turbine 40. The turbine 40 drives the compressor 20 and an external load 50 such as an electrical generator and the like. The gas turbine engine 10 may use natural gas, various types of syngas, and other fuels. The gas turbine engine 10 may use other configurations and components herein.

In this example, the gas turbine engine 10 further includes an inlet air heating and cooling system 60. The inlet air heating and cooling system 60 may be positioned about the compressor 20 and heats or cools the incoming airflow to a desired temperature. The inlet air heating and cooling system 60 includes a cold/hot water coil 70. Hot or cold water flows through the coil 70 and exchanges heat with the incoming airflow. The inlet air heating and cooling system 60 may use any type of heat exchange device therein. As described above, cold water may be provided by a water chilling plant while hot water may be provided via a waste heat recovery system or from another source.

Figure 2:
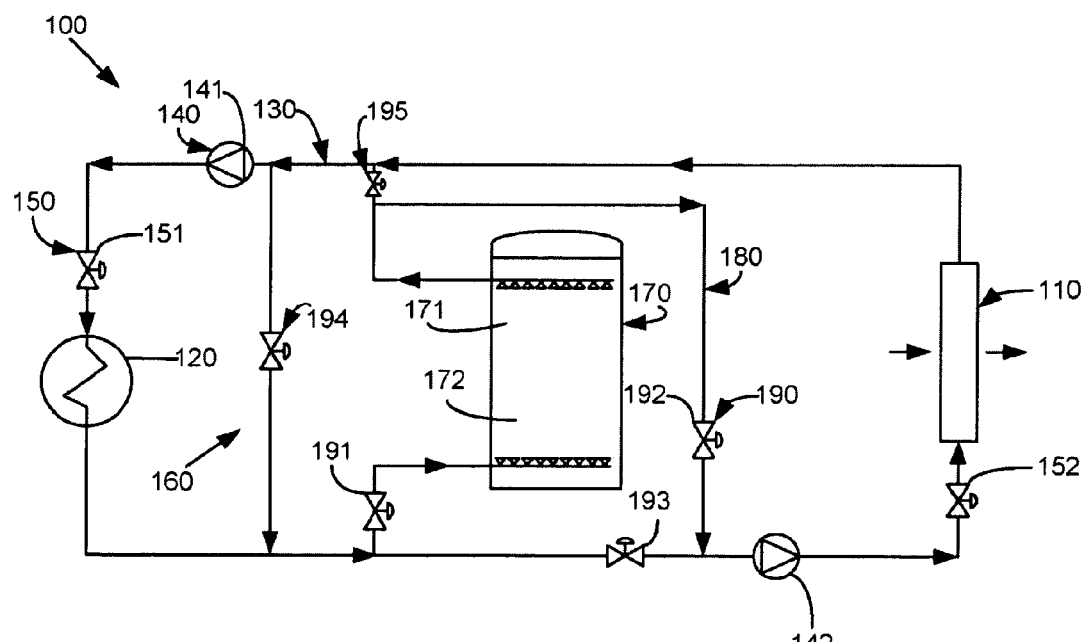
FIG. 2 is a schematic view of a gas turbine inlet air heating and cooling system in heating mode.
Figure 3:
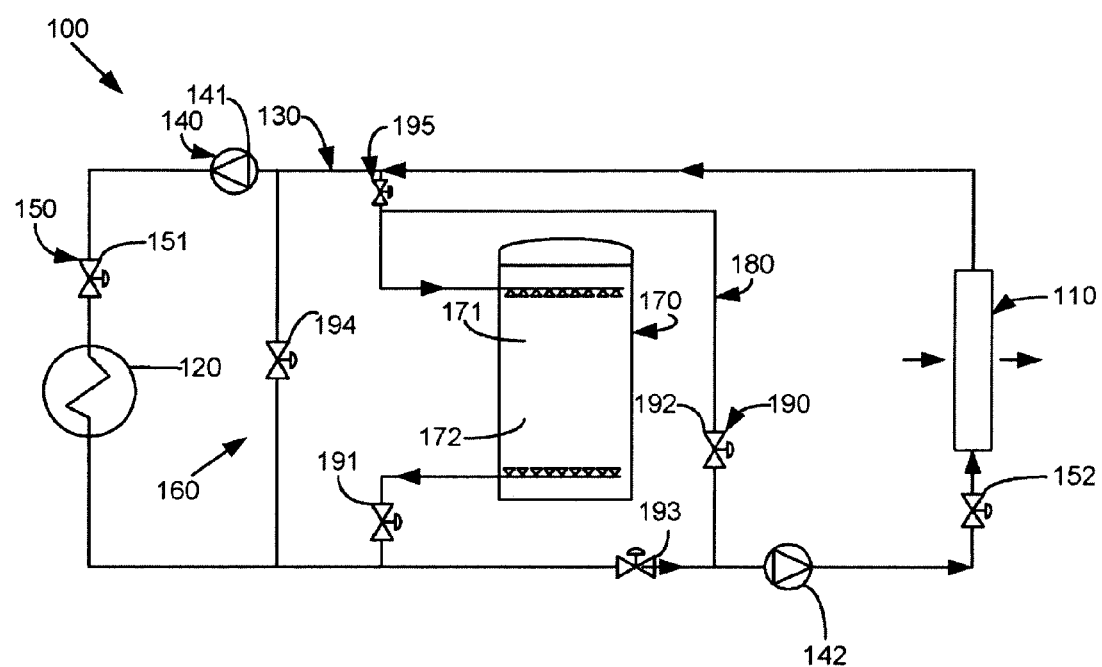
FIG. 3 is a schematic view of a gas turbine inlet air heating and cooling system in cooling mode.

FIGS. 2 and 3 show a turbine inlet air heating and cooling system 100 as is described herein. Similar to the system described above, the turbine inlet air heating and cooling system 100 includes a cold/hot water coil 110. As described above, the cold/hot water coil 110 may be positioned about the inlet of the compressor 20. The cold/hot water coil 110 heats or cools the inlet air via a water stream running therethrough. Other types of heat exchange devices may be used herein.

The cold/hot water coil 110 may be in communication with a water chiller 120. The water chiller 120 may be a mechanical chiller, an absorption chiller, or any conventional type of chilling device. As is known, the water chiller 120 provides cold water to the cold/hot water coil 110 where heat is exchanged with the incoming airflow. The warm water is then returned to the water chiller 120. The cold/hot water coil 110 may be in communication with the water chiller 120 via a primary loop 130. Hot water from waste heat or another source also may be provided to cold/hot water coil 110 via the primary loop 130. The primary loop may include a number of water pumps 140, including a chiller inlet pump 141 and a coil inlet pump 142, and a number of valves 150, including a chiller inlet valve 151 and a coil inlet valve 152, to control the flow of water therethrough.

It is important to note that the terms "hot", "warm", "cold", and "cool" are used in a relative sense. No limitation on the applicable temperature range is intended herein.

The turbine inlet air heating and cooling system 100 also may include a free inlet air heating and cooling system 160. The free inlet air heating and cooling system 160 may include a thermal energy storage tank 170. The thermal energy storage tank 170 may be a conventional stratified water thermal storage system. Other types of liquids also may be used herein. Warm water rises to a top portion 171 of the tank 170 while cooler water sinks to a bottom portion 172 of the tank 170. The thermal energy tank 170 may be in communication with the cold/hot water coil 110 via a secondary loop 180. The secondary loop 180 ties into the primary loop 130 via a number of secondary loop valves 190. These valves include tank valves 191 and 195, a warm water valve 192, a cold water valve 193, and a bypass valve 194.

FIG. 2 shows use of the free inlet air heating and cooling system 160 in the heating mode. In this mode, the water chiller 120 is turned off. The cold water valve 193 and the tank valve 195 are closed while the tank valve 191, the warm water valve 192, and the bypass valve 194 are open. Warm water from the top 171 of the thermal energy storage tank 170 passes through the warm water valve 192 and into the primary loop 130. The warm water passes through the cold/hot water coil 110 where it warms the cold incoming air. The now colder water flow returns via the primary loop 130, the bypass valve 194, and the tank valve 191 into the bottom 172 of the thermal energy storage tank 170.

Cold ambient air below about 40 degrees Fahrenheit (about 4.4 degrees Celsius) may be tempered to about 55 degrees Fahrenheit (about 12.8 degrees Celsius) so as to provide efficient part loading that may be beneficial during off peak hours. The water passing through the cold/hot water coil 110 will cool down from about 58 degrees Fahrenheit (about 14.4 degrees Celsius) to about 42 degrees Fahrenheit (about 5.6 degrees Celsius).

The heating mode of the free inlet air heating and cooling system 160 thus heats the incoming airflow without the consumption of external thermal energy. The warm water running through the cold/hot water coil 110 also can be used for compressor freeze protection so as to avoid the use of inlet bleed heat. Likewise, the warm water provides freeze protection to the cold/hot water coil 110 as well as the inlet filters without external energy or the use of antifreeze.

FIG. 3 shows use of the free inlet air heating and cooling system 160 in cooling mode. In this mode, the water chiller 120 is again turned off. Likewise, the chiller inlet pump 141 is turned off. The warm water valve 192 and the bypass valve 194 are closed while the cold water valve 193 and the tank valves 191 and 195 are opened. Cold water from the bottom 172 of the thermal energy tank 170 passes through the tank valve 191 and through the cold water valve 193 into the primary loop 130. The cold water is then pumped into and through the cold/hot water coil 110. The cold water thus cools the warm incoming airflow. The now warmer water continues to flow through the primary loop 130 and the tank valve 195 and into the top 171 of the thermal storage tank 170.

When the ambient air is about 62 degrees Fahrenheit (about 16.7 degrees Celsius), discharged cold water at about 42 degrees Fahrenheit (about 5.6 degrees Celsius) may cool the ambient airflow to as low as about 45 degrees Fahrenheit (about 7.2 degrees Celsius). The now warmer water flow may return at about 58 degrees Fahrenheit (about 14.4 degrees Celsius). The cooling effect will increase the overall power output during peak demand hours. The cooling mode thus provides chilling of the inlet air without the consumption of refrigeration energy.

The turbine inlet air heating and cooling system 100 thus may operate in a number of modes: (1) inlet cooling with only the use of the chiller 120; (2) inlet cooling with only the use of the thermal energy storage tank 170; (3) inlet cooling via the combination of the chillers 120 and the thermal energy storage tank 170; (4) charging the thermal energy storage tank 170 using only the chillers 120; (5) inlet heating using waste heat recovery via a heat recovery heat exchanger (not shown); (6) inlet heating using only the charging of the thermal storage tank 170; and (7) inlet heating using the combination of the waste heat from the heat recovery heat exchanger charging of the thermal energy storage tank 170. Modes 2 and 6 provide completely free cooling and heating. Other configurations may be used herein. Other types of thermal sources also may be used herein.

The turbine inlet air heating and cooling system 100 captures and stores the hot or cold energy of the inlet air itself for later efficient use. Significant amounts of free heating and cooling thus may be provided. Likewise, parasitic power may be reduced while overall power generation may be increased.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A heating and cooling system for inlet air of a turbine compressor, comprising:
    a fluid coil positioned about the turbine compressor;
    a thermal energy storage tank comprising a stratified fluid thermal storage tank with a top portion having warmer fluid and a bottom portion having cooler fluid;
    a primary loop comprising the fluid coil, a water chiller, a water chiller valve, and a cold water valve;
    a bypass line comprising a bypass valve, the bypass line having a first end connected to the primary loop upstream of the water chiller and the water chiller valve, and having a second end connected to the primary loop downstream of the water chiller and the water chiller valve;
    a first line connected to the primary loop between the bypass line second end and the cold water valve, the first line communicating the primary loop to the bottom portion of the thermal energy storage tank;
    a second line connected to the primary loop between the bypass line first end and the fluid coil, the second line communicating the primary loop to the top portion of the thermal energy storage tank, the second line comprising a tank valve; and
    a third line having a first end connected to the second line, the third line having a second end connected to the primary loop between the cold water valve and a fluid coil inlet pump upstream of the fluid coil, the third line comprising a warm water valve.

2. The system of claim 1, wherein the fluid coil comprises a cold/hot water coil.

3. A method of free heating and cooling of inlet air of a turbine compressor, comprising:
    a heating mode comprising:
        flowing a fluid at a first temperature from a top portion of a thermal energy storage tank to a coil;
        exchanging heat in the coil with a flow of inlet air such that the fluid reaches a second temperature, wherein the second temperature is lower than the first temperature; and
        flowing the fluid from the coil to a bottom portion of the thermal energy storage tank, wherein flowing the fluid from the coil to the bottom portion of the thermal energy storage tank comprises bypassing a water chiller;

a cooling mode comprising:

flowing the fluid at the second temperature from the bottom portion of the thermal energy storage tank to the coil;

exchanging heat in the coil with the flow of inlet air such that the fluid reaches the first temperature; and flowing the fluid from the coil to the top portion of the thermal energy storage tank.

4. The method of claim 3, wherein the step of flowing the fluid at the second temperature from the bottom portion of the thermal energy storage tank to the coil comprises flowing cool water from the bottom portion of the thermal energy storage tank to the coil.

5. The method of claim 4, wherein the step of exchanging heat in the coil with the incoming flow of inlet air such that the fluid reaches the first temperature comprises exchanging heat with a warm flow of inlet air.

6. The method of claim 5, wherein the step of flowing the fluid at the first temperature to the top portion of the thermal energy storage tank comprises flowing warm water back to the top portion of the thermal energy storage tank.

7. The method of claim 6, wherein the step of flowing the fluid from the bottom portion of the thermal energy storage tank to the coil to exchange heat with the flow of the inlet air comprises flowing cool water from the bottom portion of the thermal energy storage tank to exchange heat with a warm flow of inlet air.

8. The method of claim 3, wherein the step of flowing the fluid at the first temperature from the top portion of the thermal energy storage tank to the coil comprises flowing warm water from the top portion of the thermal energy storage tank to the coil.

9. The method of claim 8, wherein the step of exchanging heat in the coil with the incoming flow of inlet air such that the fluid reaches the second temperature comprises exchanging heat with a cool flow of inlet air.

10. The method of claim 9, wherein the step of flowing the fluid at the second temperature to the bottom portion of the thermal energy storage tank comprises flowing cool water back to the bottom portion of the thermal energy storage tank.

11. The method of claim 10, wherein the step of flowing the fluid from the top portion of the thermal energy storage tank to the coil to exchange heat with the flow of inlet air comprises flowing warm water from the top portion of the thermal energy storage tank to exchange heat with a cold flow of inlet air.

12. The method of claim 3, further comprising chilling the fluid with the water chiller.

* * * * *